United States Patent [19]
Gray et al.

[11] Patent Number: 5,434,911
[45] Date of Patent: Jul. 18, 1995

[54] CALL IN-BOUND REMOTE READING AND DATA COLLECTION SYSTEM

[75] Inventors: Bruce E. Gray, Murrysville; Donald R. Fletcher, Belle Vernon, both of Pa.

[73] Assignee: M & FC Holding Company, Inc., Wilmington, Del.

[21] Appl. No.: 72,737

[22] Filed: Jun. 4, 1993

[51] Int. Cl.⁶ .......................................... H04M 11/00
[52] U.S. Cl. ................... 379/106; 379/107; 379/102
[58] Field of Search ............... 379/106, 107, 102, 104, 379/39, 40; 340/870.02

[56] References Cited

U.S. PATENT DOCUMENTS

| | | |
|---|---|---|
| 3,390,234 | 6/1968 | Glidden . |
| 3,553,376 | 1/1971 | Bogaart et al. . |
| 3,588,357 | 6/1971 | Sellari, Jr. . |
| 3,842,208 | 10/1974 | Parasekvakos et al. . |
| 3,883,695 | 5/1975 | Bickel et al. . |
| 3,922,490 | 11/1975 | Pettis . |
| 4,077,030 | 2/1978 | Helava . |
| 4,086,434 | 4/1978 | Bocchi . |
| 4,104,486 | 8/1978 | Martin et al. . |
| 4,108,709 | 12/1978 | Cosgrove et al. . |
| 4,126,762 | 11/1978 | Martin et al. . |
| 4,132,981 | 1/1979 | White . |
| 4,273,961 | 6/1981 | Blank et al. ................ 379/40 |
| 4,345,113 | 8/1982 | Shelley . |
| 4,355,205 | 10/1982 | Walker . |
| 4,394,540 | 7/1983 | Willis et al. . |
| 4,455,453 | 6/1984 | Parasekvakos et al. . |
| 4,463,354 | 7/1984 | Sears . |
| 4,469,917 | 9/1984 | Shelley . |
| 4,504,831 | 3/1985 | Jahr et al. . |
| 4,549,044 | 10/1985 | Durham . |
| 4,578,534 | 3/1986 | Shelley . |
| 4,578,536 | 3/1986 | Oliver et al. . |
| 4,608,552 | 8/1986 | Boutonnat et al. . |
| 4,644,103 | 2/1987 | Rosenfeld . |
| 4,652,877 | 3/1987 | Gray . |
| 4,654,868 | 3/1987 | Shelley . |
| 4,682,169 | 7/1987 | Swanson . |
| 4,847,892 | 7/1989 | Shelley . |
| 4,852,152 | 7/1989 | Honick . |
| 5,031,209 | 7/1991 | Thornborough et al. .......... 379/107 |
| 5,134,650 | 7/1992 | Blackmon . |
| 5,189,694 | 2/1993 | Garland . |
| 5,204,896 | 4/1993 | Oliver ............................... 379/107 |
| 5,239,575 | 8/1993 | White et al. ........................ 379/107 |

FOREIGN PATENT DOCUMENTS 1253826 11/1971 United Kingdom .

OTHER PUBLICATIONS

Schlumberger Industries, Inc. Communications Systems Div., MIV-T-1002 (1992) [2 page sales brochure].
PCT Publication WO 87/07993 (PCT/US87/01509) Dec. 30, 1987.

Primary Examiner—Curtis Kuntz
Assistant Examiner—Stella L. Woo
Attorney, Agent, or Firm—Lorusso & Loud

[57] ABSTRACT

A call in-bound remote reading and data collection system for the remote reading of utility meters, including a data processor and a remotely located meter interface unit (MIU) interconnected to at least one utility meter to be read. Also disclosed is a meter interface unit and a method for the remote reading of utility meters and the collection of data. The data processor collects, stores and processes data and includes a modem to interconnect the data processor to conventional telephone lines. The MIU is interconnected to the telephone lines and the data processor, to transmit scheduled meter reading to the data processing means, when a prespecified interval has elapsed. The MIU is also interconnected to transmit unscheduled or demand meter readings when the MIU receives telephone line transmissions requesting such a reading (e.g. receipt of a specified tone). A modem is used to interconnect the MIU so it can communicate over the telephone lines. The MIU includes a microprocessor that generally controls the operation of the MIU and supervises the transfer of data between the data processor and the meter interface unit. Specifically the microprocessor processes commands from the data processor and outputs data, in response to the commands received, to the data processor.

45 Claims, 8 Drawing Sheets

CALL IN-BOUND REMOTE READING AND DATA COLLECTION SYSTEM

FIELD OF INVENTION

This invention relates to a system and method for remotely reading utility meters and transmission of data to a data collection center over telephone lines and more particularly to a system where the remote reading device, sometimes referred to as a meter interface unit, calls into the data collection center to transfer the requested data or information transfer device.

BACKGROUND OF THE INVENTION

Dial in-bound meter interface units (MIU) dial up a central computer periodically or at predetermined times to transmit certain information. Typically the MIU seizes the line, if not busy, and dials the central computer.

U.S. Pat. No. 4,847,892, discloses a MIU having both a dial inbound and remote monitoring capability. During the dial in-bound mode, the MIU calls the computer at a preset time as determined from a clock. In the remote monitoring mode, the clock connects the data set to a subsystem which standbys during a predetermined interval to detect a call from the central computer.

The prior art, however, does not disclose a call in-bound system or methodology which allows the MIU to make scheduled and unscheduled calls to the central computer, nor a system or methodology which uses a callback scheme to reduce the potential for message collisions at the host computer or overloading of the telephone system.

Utility meters are read periodically so that a customer is billed periodically for a customer's use or consumption of utility provided service, goods or materials. However, it is also necessary to perform meter reads at unscheduled times at the request of the customer or if required by the utility. For example, if an individual has sold their house, it is common practice for the water, gas and electric meters to be read just before transferring ownership in the property. Existing call in-bound systems cannot make these kinds of readings because the MIU only functions at prespecified times. Instead a utility representative would have to be dispatched to the house to read the meter.

While a system can be initially configured to minimize message collision and overloading the telephone system, it is possible that at the scheduled call-in time a call cannot be made. Busy phone lines, bad connections, a busy host computer, for example, can contribute to a failure to make the call-in at the scheduled time. Given the large numbers of meters that are typically being read, the scheme for retry call-in's should consider the effect these calls will have on the telephone system and the host computer.

Therefore, it is an object of the present invention to provide a system and methodology where the MIU can make both scheduled and unscheduled calls to the host computer.

It is another object of the present invention to provide a system and methodology which can be used with batteryless MIU's or MIU's which require the use of energy conservation techniques.

It is a further object of the present invention to provide a system and methodology where the callback scheme considers the impact of call-in's on the phone system.

It is yet another object of the present invention to provide a system and methodology where a MIU can select a phone number to dial based on the reason for calling and the success in calling in.

It is yet a further object of the present invention to provide a system and methodology where the unscheduled call process is initiated by providing a signal to the MIU.

SUMMARY OF THE INVENTION

The objects of the present invention are accomplished using a microprocessor controlled MIU in conjunction with a host computer and interconnecting them via phone lines. The MIU includes means for determining when the time has elapsed for a scheduled call-in and for determining if an unscheduled call-in is being commanded. After the MIU and the host computer have been successfully interconnected via the phone lines, data or information transmission begins under the control of the host computer but under the MIU's supervision. Specifically, the MIU terminates the established connection if certain conditions exist.

DESCRIPTION OF THE PREFERRED EMBODIMENT

Figure 1:
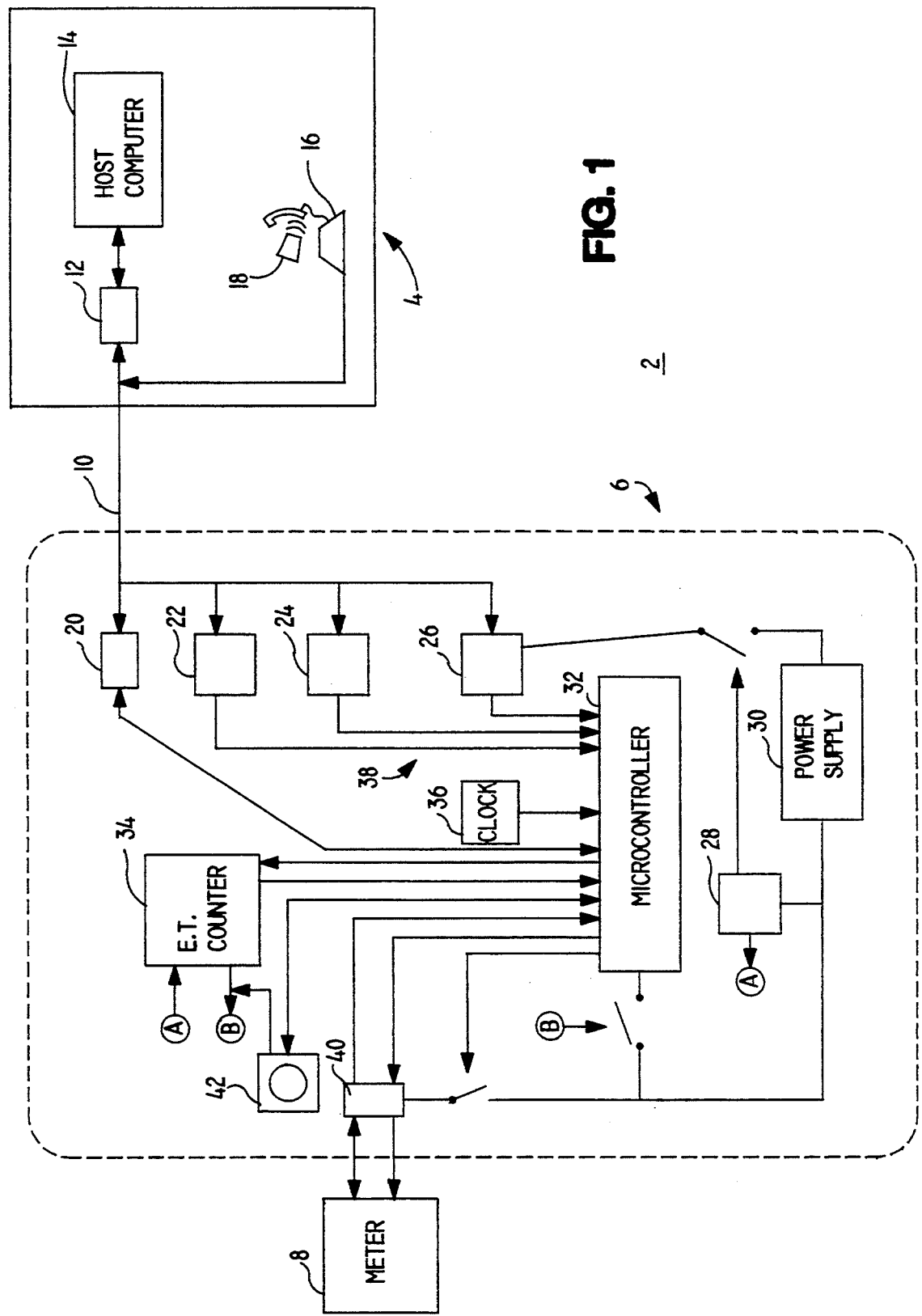
FIG. 1 is a block diagram of a remote reading and data collection transmission system of the present invention.
Figure 2A:
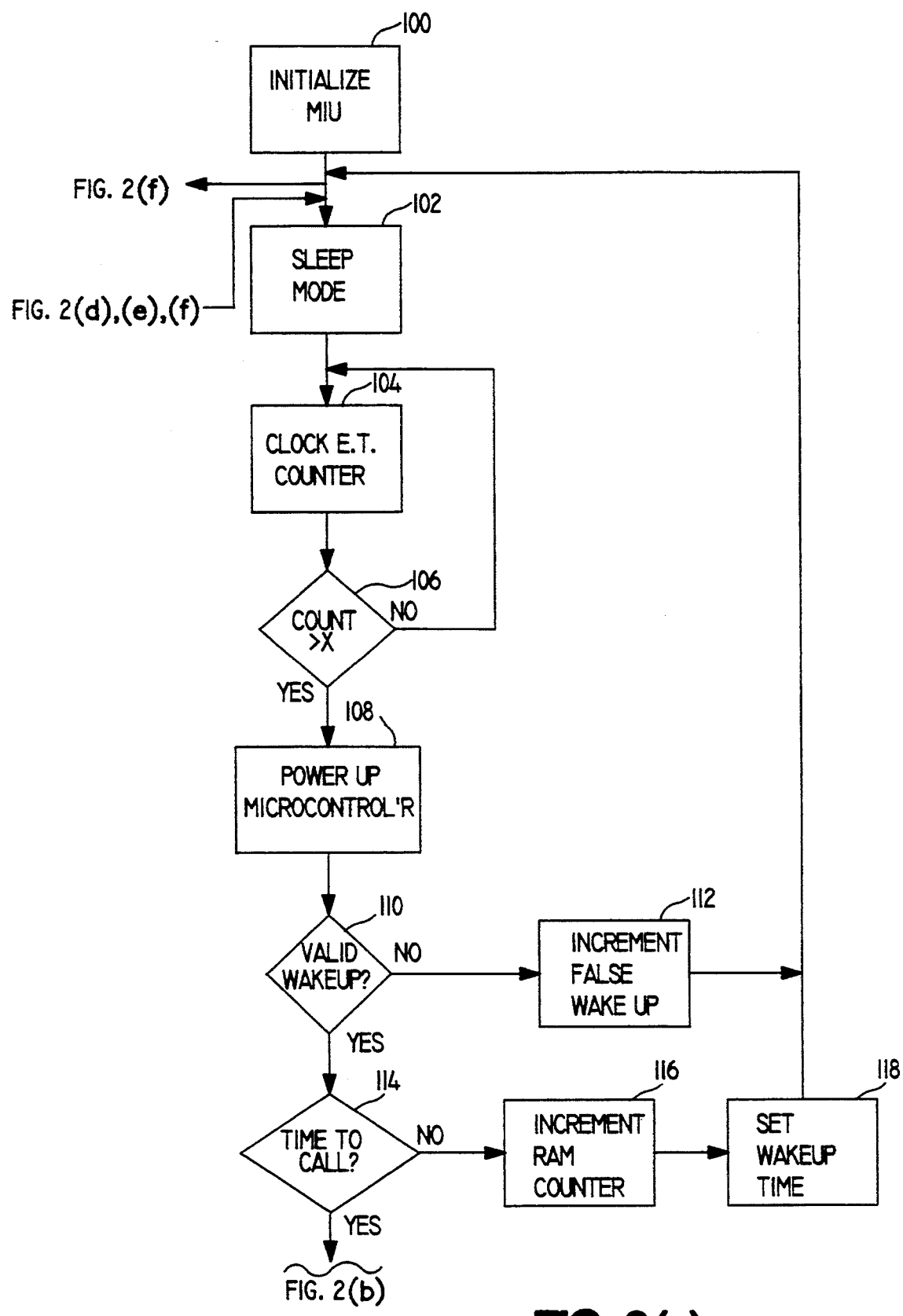
FIGS. 2a-f is a flow diagram of the system's operations involving data collection activities.
Figure 2B:
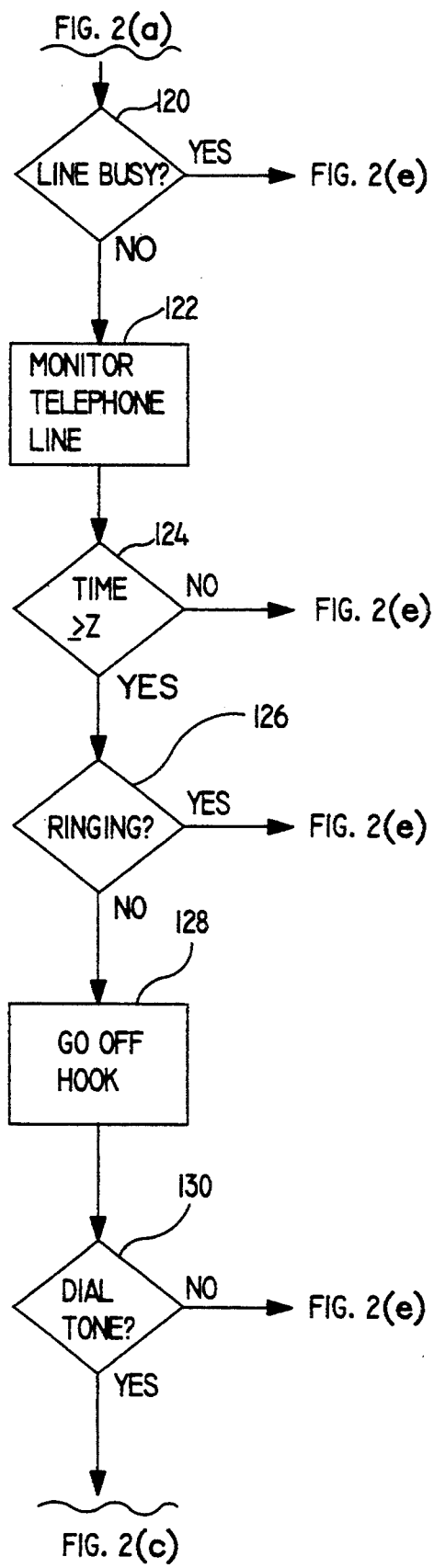
Figure 2C:
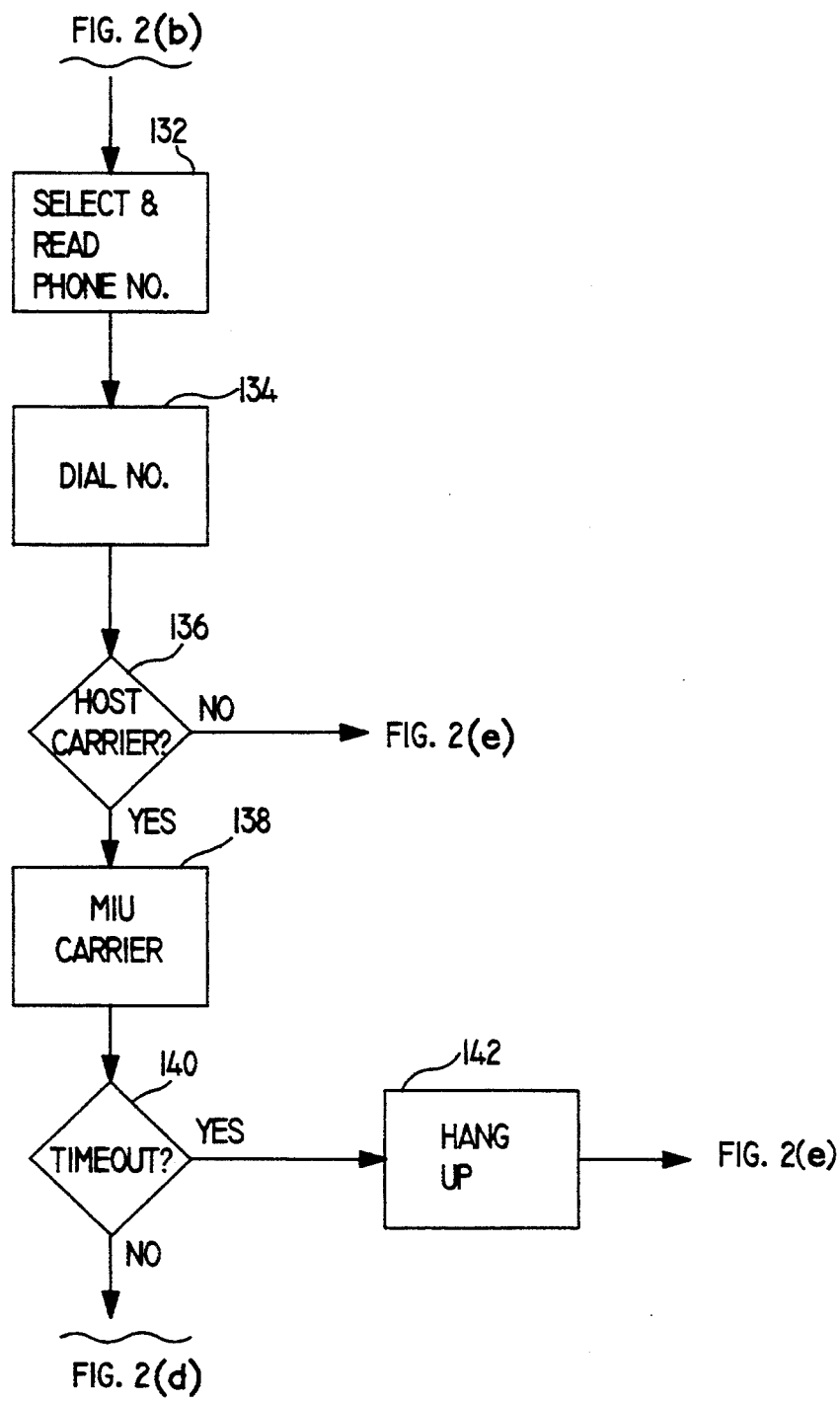
Figure 2:
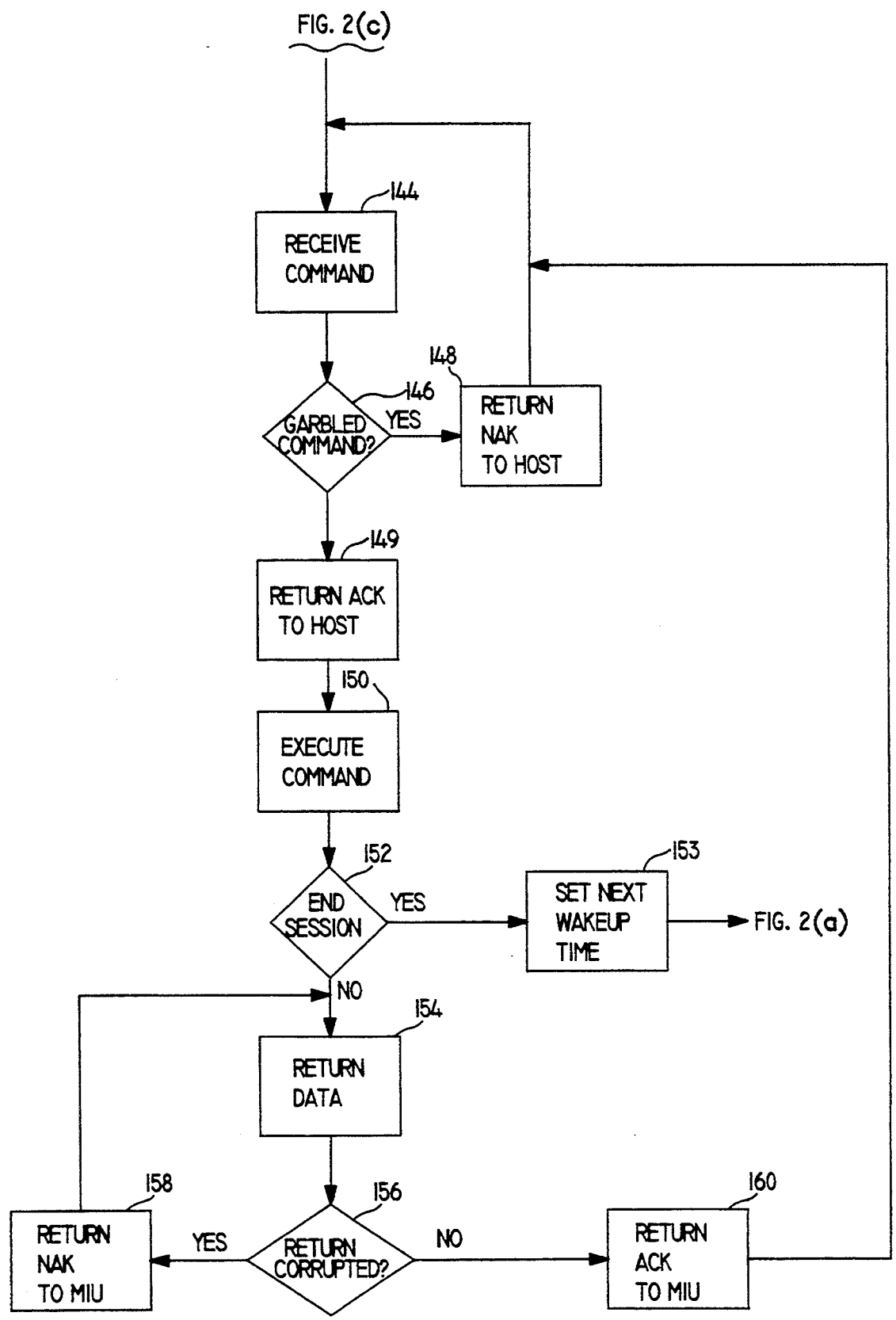
Figure 2:
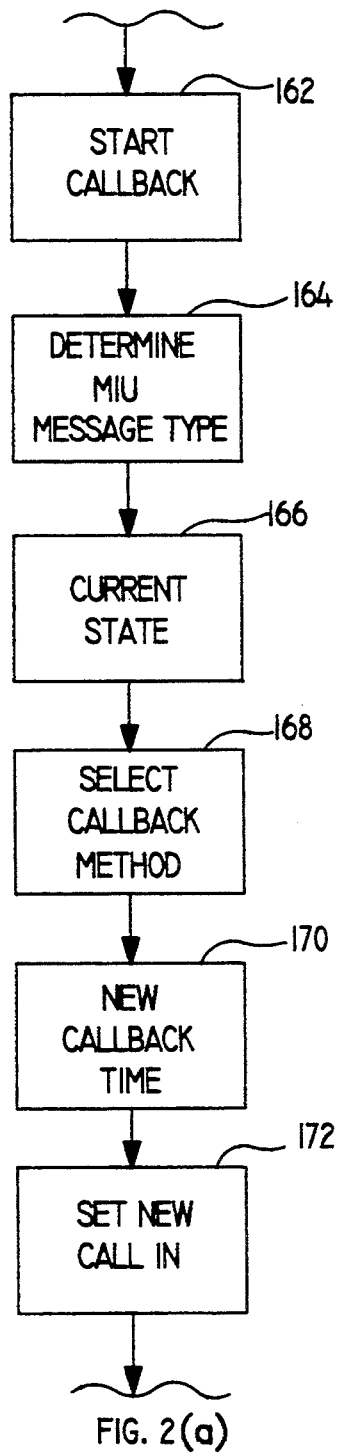
Figure 2:
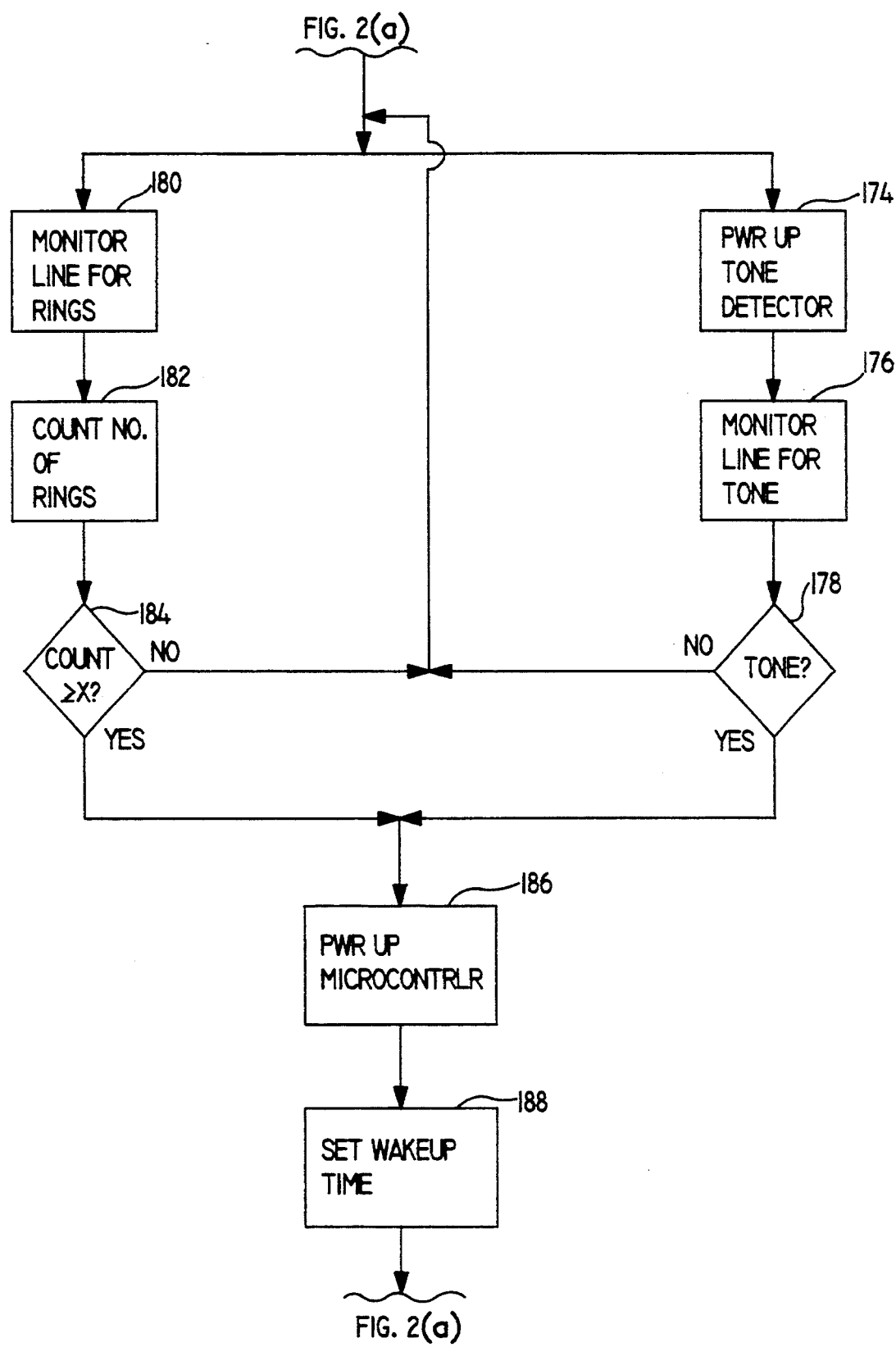

A remote reading and data collection system 2 of the present invention is shown FIG. 1 and includes a data collection center 4 and a meter interface unit (MIU) 6. The MIU 6 interfaces with a meter 8, so that a meter register reading can be obtained by the MIU and the extracted information transmitted to the data collection center 4 over conventional telephone lines 10.

The system 2 of the present invention is configured so data or information is communicated from the MIU 6 to the host computer 14 under one of two situations. The MIU 6 provides the information or data either when a prespecified period of time has elapsed or when a demand reading request is communicated to the MIU 6. A demand reading is an unscheduled reading of a meter 8 by the utility or at the request of the customer (e.g., when a customer moves).

Each data collection center 4 includes a modem 12 and a host computer 14. The host computer may be any computer known in the art which can be configured to communicate over telephone lines with another device using a modem. For example, the host computer may be a personal computer using an INTEL 80286 or 80386 CPU.

In a preferred embodiment, the data collection center modem 12, as well as the MIU modem 20, communicate via Bell 103 type FSK modem parameters. However, the data collection center modem 12 and MIU modem 20 may be upgraded to use other modem types such as the Bell 212A type.

The data collection center 4 may also include a telephone 16 that is used in conjunction with an MIU alert unit 18 to provide a demand read capability for the system. The MIU alert unit 18 is a handheld device that provides an audible tone message which is injected into the telephone lines 10 via the telephone 16. For example, during a call between a customer and a utility service representative, the utility representative holds the MIU alert unit 18 up near the receiver of the telephone 16. The alert unit 18 is then actuated so that the audible tone message is inserted into the phone line 10.

As discussed below in connection with FIGS. 2a-f, when this tone message is received by the MIU 6, the message is recognized as being a request for the MIU 6 to make a demand reading of the meter 8 and to transmit the meter reading results to the host computer 14. The audible tone message preferably consists of an alert tone preamble and a command that defines the MIU's response. In a preferred embodiment, the preamble is a 4.2 second duration 520 Hz alert tone and the command is an 8 bit byte. The MIU 6 will, after receiving this tone message, make a meter reading and communicate the information back to the host computer 14.

To detect the alert tone message, the MIU 6 includes a alert tone detection means 26 that is periodically powered up by the timing means 28. When powered up, the tone detection means 26 monitors the telephone line 10 whether in the on-hook or off-hook condition to detect the presence of the tone being used for the tone message preamble. If the preamble tone (e.g., a 520 Hz tone) is detected, the tone detection means 26 powers up the MIU's microcontroller 32 so that it can read the command portion of the tone message and determine the response of the MIU 6.

To allow independent operation, the timing means 28 is connected directly to the power supply 30. The timing means outputs a signal to the alert tone detection means 26 periodically, as noted above, so the detection means 26 monitors the phone line 10 for an alert tone. In a preferred embodiment, the timing means includes a 32 kHz oscillator working in conjunction with a 32768 Hz crystal. The timing means also outputs a signal to the elapsed time counter means 34. The elapsed time counter means 34 counts the number of pulses from the timing means 34 and when the number of counts exceeds a preset value, the counter means 34 outputs a signal to power up or wake up the microcontroller 32. The elapsed time counter means 34 is an integrated circuit that is programmed to output a wake-up signal at a prespecified time interval. In a preferred embodiment the interval programmed is either 16 seconds or 1024 seconds.

The MIU microcontroller 32 controls all functions of the MIU 6 except for the timing means which operates independently of the rest of the MIU 6. The MIU microcontroller 32 is a Motorola 68HC05 family device and contains an onboard EEPROM, RAM EPROM, timers and a serial port. The RAM is external to the processor and is backed by the power supply so that it does not lose any information stored therein when the rest of the microcontroller is powered down. The functions of the MIU microcontroller 32 are clocked by a clock 36. The clock 36 generates the clock signals using a 1.8432 MHz crystal. When the MIU 6 is connected to the phone lines, the microcontroller 32 receives the commands from the host computer 14 directing the MIU's response and the microcontroller provides encoded information to the MIU modem 20 for transmission to the host computer.

The MIU 6 has a line monitor means 22 and ring detector means 24 that are in continuous operation. After the microcontroller has been powered up but before the MIU 6 seizes the phone line 10 to start a data transmission, the MIU's line monitor means 22 monitors the phone line to determine if the line is in use (i.e., busy). The ring detector means 24 monitors the phone line 10 to see if the customer's phone (not shown), also connected to these phone lines, is being called (i.e., phone is ringing). The ring detector means 24 is also used, when the MIU 6 is in the on hook mode, to detect a predetermined number of rings indicating a demand read. The operation of the line monitor means 22 and the ring detector means 24 is further described below in connection with FIGS. 2a-f. The line monitor means 22 and ring detection means 24 are circuits or components known to those of skill in the art. Input lines interconnecting the MIU microcontroller 32 and the line monitor means 22, the ring detector means 24 and the alert tone detector means 26 are provided so that output signals from the means 22,24,26 are inputted to the microcontroller.

The tone detector means 26 is periodically powered up because the idle state for the majority of the MIU 6 is a powered down condition. Powering down most of the the MIU 6 except during specific periods of MIU activity is done to conserve the energy of the MIU power supply 30. In a preferred embodiment, the power supply 30 is batteryless and uses a capacitor as the major energy source. The capacitor is sized so the MIU 6 can operate normally for approximately 24 hours before the capacitor needs to be recharged. In the preferred embodiment, the capacitor would be charged when the MIU is on-hook or off-hook.

When in the on hook mode, the amount of current that the MIU 6 can draw from the phone line on average equals or is less than the allowable leakage current permitted by the applicable regulations. The portions of the MIU 6, as described below, which operate only in the off hook mode can be powered from the phone line's off hook current. Any excess current that exists beyond the needs of the MIU 6 is used to recharge the capacitor.

The power supply 30 may include a battery, such as a lithium 3.6 volt battery, as the primary or major energy source. In this case, the operations of the MIU 6 to conserve power would be used to extend the life of the battery.

The MIU 6 includes an interface connection means 40 between the MIU microcontroller 32 and the register of the meter 8 or meters to be read. The MIU of the present invention is designed to interface with two encoder type utility meters. The interface connection also includes the means for powering up the meter register so it can be read. The powering up of the meter register is under the control of the microcontroller 32 to conserve power.

The MIU 6 includes an external connection port 42 interconnected to the microcontroller 32. An external device (not shown), such as a microcomputer is connected to the external port 42 so that operating parameters (e.g., phone numbers to call, MIU ID number) are programmed into the microcontroller for the proper operation of the MIU 6. As explained below, after the operating parameters have been programmed into the microcontroller 32, the host computer 14 as well as an external device can be used to reset or change the operating parameters.

As indicated above the MIU 6 is designed to interface with encoder type utility meters 8. Some examples of such meters include Sensus ECR and Schlumberger ARBII. Non-encoder meters using a pulse counting scheme may be utilized if the MIU 6 is modified to include a pulse counting interface circuit.

The operation of the system can be best understood by referring to the flow diagram provided in FIGS. 2a-f. Reference should also be made to FIG. 1 for the functional blocks of the system 2 and MIU 6 in the following discussion. The discussion of FIGS. 2a-f, presumes that the microcontroller 32 was initially programmed with the information required for the proper operation of the MIU 6 and the system 2, step 100. Programming of the microcontroller 32 with the required operating parameters is discussed below with FIG. 3.

As indicated above, during idle periods, the MIU 6 except for the timing means 28, is normally powered down or in the sleep mode, step 102. The MIU 6 and the various parts of the MIU including the microcontroller 32 are powered up and then powered down into the sleep mode, step 102, depending upon the specific actions being taken by the MIU 6.

As discussed above in connection with FIG. 1, the MIU 6 provides the requested information or data when a prespecified period of time has elapsed. To determine if the time period has elapsed, an elapsed time counter means 34 is clocked, step 104. Each clock pulse increments the counter means 34 so that the number of counts equals the time that has elapsed since the initialization of the counter means.

The count is continuously evaluated to determine if the number of counts exceeds a prespecified value, step 106. In this way the counter means 34 determines if a prespecified period has elapsed. If the count does not exceed the value (NO), then the counter means 34 is again provided with another clock pulse until the prespecified value is exceeded.

If the count exceeds the value (YES), then the microcontroller 32 is powered up, step 108. After powering up, an evaluation is made to determine if the microcontroller 32 was validly powered up or was powered up because of a spurious signal, step 110. If the microcontroller was not turned on validly (NO), then a false wakeup register means of a power supply backed RAM is incremented, step 112, and the MIU 6 is instructed to go back to sleep, step 102. This evaluation involves determining if the microcontroller was turned on for any one of the valid reasons why it should be powered up.

If the microcontroller 32 was validly powered up (YES), then an evaluation is made to determine if the time which has elapsed equals the time period specified for contacting the host computer 14 and transmitting information, step 114. In a preferred embodiment, the microcontroller 32 is powered up periodically by the elapsed time counter means 34 at time intervals less than the elapsed time period specified for contacting the host computer 14.

In an embodiment of the present invention the elapsed time counter means 34 uses a time interval of 1024 or 16 seconds to determine when the microcontroller should be powered up. Because the time interval specified for contacting the host computer and transmitting information is typically large, the time interval usually selected for the elapsed counter means 34 is 1024 seconds. The time interval is reduced to 16 seconds when the difference between the specified time interval for contacting the host computer and the elapsed time (i.e., the time remaining) is less than 1024 seconds.

If it is not time to contact the host computer (NO), then a time register means in the power supply backed RAM is incremented, step 116. The microcontroller 32 then determines what its next wakeup time should be (i.e., 1024 or 16 seconds) and sets the prespecified count value of the elapsed time counter means accordingly, step 118. In this way, the microcontroller 32 dynamically adjusts its wakeup time based on the time remaining. After setting the new wakeup time, the MIU 6 is instructed to go back to sleep, step 102. The MIU remains asleep until awoken by the elapsed time counter means 34 or by a read demand command.

If it is time to contact the host computer (YES), then the phone line 10 is checked to see if it is busy, step 120. The line monitor means 22 checks the phone line 10 to see if the utility customer is making an outbound call. If the line is busy (YES) then the microcontroller 32 starts the callback algorithm to determine when to try and make another call to the host computer 14, step 162, FIG. 2e.

If the phone line is not busy (NO), then the phone line is monitored for a prespecified time period for the customer's use, step 122. The line monitor means 22 again is used to monitor the phone line 10 to see if during the prespecified time period the utility customer makes a call out on the line. In an embodiment, the prespecified time period for monitoring the phone line is 256 seconds. An evaluation is made to determine if the phone is used before the time runs out, step 124. If the phone line is used during this time period (NO), then the microcontroller 32 starts the callback algorithm to determine when to try and make another call to the host computer 14, step 162, FIG. 2e.

If the phone line is not in use (YES), then the phone line is checked to determine if the customer's phone is ringing (i.e., an inbound call to customer), step 126. The ring detector means 24 monitors the phone line to see if ring bursts are being transmitted on the line. If the phone is ringing (YES), then the microcontroller 32 starts the callback algorithm to determine when to try and make another call to the host computer 14, step 162, FIG. 2e.

If the phone is not ringing (NO), then the MIU 6 goes off hook and seizes the phone line, step 128. After seizing the line, the phone line 10 is checked to see if there is a dial tone, step 130. It is possible that after seizing the phone line there is no dial tone because, for example, the circuits are busy. If there is no dial tone (NO), then the microcontroller 32 starts the callback algorithm to determine when to try and make another call to the host computer 14, step 162, FIG. 2e.

If a dial tone is present (YES), then the phone number to dial is selected and the number read out from memory, step 132. The MIU 6 is programmed initially with the phone numbers to dial to reach the host computer 14. The phone number selected is dependent upon the type of message being sent from the MIU 6.

Messages are categorized, based on the reason for calling, into one of three types, where each message type is sent to a prespecified phone number. A message being sent by the MIU at the programmed call in time, is a type 1 message. A message being sent in response to a ring sense demand read command or a tone sense demand read command is a type 2 message. A message sent to identify an alarm condition, an internal error or a low power supply voltage (e.g., low capacitor voltage) is a type 3 message. In a preferred embodiment, type 1 messages are initially sent to the number designated as the primary phone number; type 2 messages are initially sent to the number designated as the alternate phone number; and type 2 messages are initially sent to the number designated as the emergency phone number. Each of these phone numbers are initially programmed into the MIU 6 for later use in transmitting information.

After reading the phone number for the type message being sent, the number is then dialed, step 134 to interconnect the MIU 6 and the host computer 14. After making the call, the MIU (i.e., the line monitor means 22) monitors the phone line for a carrier from the host computer indicating that the numbered dialed was reached, step 136. If a carrier is not detected within a prespecified time interval(NO), then the microcontroller 32 starts the callback algorithm to determine when to try and make another call to the host computer 14, step 162, FIG. 2e.

Whenever the MIU 6 communicates with the host computer 14 and expects a response from or further action by the host computer, a software timeout clock is started by the MIU to determine if the action from the host computer occurs within a prespecified time interval. In the present invention this time interval is set at 30 seconds.

If a carrier is sensed by the MIU 6 (YES), then the MIU modem 20 generates a carrier that is sent back to the host computer, step 138. At this point a proper telephone connection is established between the MIU and the host computer 14. At the same time, the software timeout clock is again started by the MIU, step 140. If the timeout clock interval expires (NO) before the MIU receives a command from the host computer, the MIU breaks the connection (i.e., hangs up), step 142 and the microcontroller 32 starts the callback algorithm to determine when to try and make another call to the host computer 14, step 162, FIG. 2e.

If the time out interval has not expired (NO), then the host computer 14 issued command is received by the MIU 6, step 144. The command received is evaluated to see if it was properly transmitted and received, step 146. If the message was not properly received, then the MIU returns a no acknowledgment message ("NAK") to the host computer 14, step 148 and the MIU awaits the retransmission of the host computer command. The retransmission of the command is also subject to the software timeout clock under the MIU's control (i.e., call termination if retransmitted command not received within timeout interval).

If the call is properly received, the MIU 6 returns an acknowledgment message ("ACK") to the host computer 14, step 149. The MIU then executes the command sent by the host computer, step 150. For example, if the command was to view the MIU ID number, the MIU would acquire the ID number stored in memory and encode it for transmission. The command is also evaluated to see if it is an end session command, step 152. If it is an end session command (YES), then the MIU's next wakeup time is set in the MIU's memory, step 153, and the MIU is instructed to go back to sleep, step 102.

If the command received is not an end of session command (NO), the information or data requested is sent to the host computer 14, step 154. The data received is then evaluated by the host computer to see if it was properly transmitted and received, step 156. If the data message was not properly received (YES), then the host computer returns a NAK message to the MIU 6, step 158 and the host computer awaits the retransmission of the data message.

If the data message was properly received (NO), the host computer 14 returns an ACK message to the MIU 6, step 160. As noted above, the MIU starts the timeout clock every time it communicates with the host computer. In this case, the clock starts when the MIU transmits the data message. If the host computer's NAK or ACK message is not received by the MIU before timeout is reached, then the MIU terminates the call and the microcontroller 32 starts the callback algorithm to determine when to try and make another call to the host computer 14, step 162, FIG. 2e.

If the ACK message is received before timeout, then the MIU 6 awaits the transmission and receipt of another command, step 144. The command process described above, steps 144-160 is repeated until terminated by an end session command, step 152. Typically, as part of the command process, the host computer 14 sets the time interval for the next programmed call in by the MIU before sending the end session command.

Whenever in the awaiting for command mode, the MIU 6 scans the incoming serial data for a message block containing the command code or the single character command ENQ, the inquiry command that is used to start all command sequences. In the present invention when the MIU receives a valid message block, the MIU will treat the first two bytes of the message block as a command to perform some action. Data being sent to an MIU, such as the new time interval for the next programmed call in, is included as the remaining part of the message data. Because of system and MIU requirements only one command can be issued and processed at a time. Some of the specific commands used by the system and the associated description follows the discussion of FIG. 3.

As provided in a number of places above, when a call that should be made to a host computer cannot be made or is terminated by the microcontroller software timeout clock, the callback algorithm is started, step 162. This is done so that the MIU can schedule a call-in retry at a later time. The retry scheduling must be done in a manner to assure that the telephone system is not overloaded by numerous simultaneous MIU call-ins and to minimize the potential for message collisions.

The action that a MIU 6 of the present invention takes in scheduling a retry is dependent upon the reason for the call, as such a determination is made to establish the MIU message type, step 164. The scheduling of the retry is also dependent upon the number of call-in's that have already been attempted, accordingly a determination is made as to the current state of the MIU replies (i.e. the number of unsuccessful call-in's), step 166.

For purposes of the retry algorithm, an attempt to place a call when the consumer's line is busy is merely rescheduled for a fixed period of time later. Since this is not considered by the system to be an unsuccessful call, the retry current state is not changed for purposes of determining what action to take for a subsequent unsuccessful call.

Unsuccessful call-in's are preferably scheduled for a retry using a retry Algorithm table. In an embodiment of the present invention the retry algorithm table for a message type 1 is as follows.

| MES-SAGE TYPE | CURRENT STATE | PHONE NUMBER | SCHEDULED NEXT RETRY |
|---|---|---|---|
| 1 | 1 | P | 256 seconds |
|   | 2 | P | 256 seconds |
|   | 3 | A | 256 seconds |
|   | 4 | A | Random scheduled over a 24 hr. time span |
|   | 5 | A | Randomly scheduled over a 72 hr. time span |
|   | >5 | A | Randomly scheduled over a 72 hr. time span |

Based on the the message type and the current state, the specific callback method is selected, step 168. For example the call back method selected for a message in the message type 1 category and having a current state of 4 would provide that the next attempted call in to the host computer is randomly scheduled over a 24 hr. period and the call shall be made to the alternate phone number for the host computer 14.

After selecting the callback method, the callback time for the retry is determined, step 170. In the above example, the microcontroller 32 would calculate a random call in time interval for the retry. The calculated interval would be stored in the MIU 6 and a new wakeup time for the MIU's call would be be set, step 172. The MIU is then instructed to go back to sleep, step 102.

As provided above, in addition to providing information when a programmed call in time has been reached, the MIU 6 wakes up and transmits information to the host computer 14 when a demand read command is received by the MIU. A demand read command can be generated in one of two ways, by injecting an audible tone message into the phone line 10 or by calling the customer's number and letting the phone ring 16 times.

To detect the tone preamble of the tone message, the tone detector means 26 is powered up, step 174 (FIG. 2e). As indicated above the detector means is powered up periodically to monitor the phone line 10 for the presence of a specified tone, steps 176, 178. If the specified tone is not detected NO, then the MIU 6 continues to periodically power up the tone detector means to monitor the phone line.

For ring detection, the line is monitored for ring bursts, step 180, using the ring detector means 24. When rings are detected, the number of consecutive rings is counted, step 182 to see if it exceeds 16 rings, step 184. If the number of consecutive rings counted is less than 16 (NO), then the MIU returns to monitoring the line for ring bursts, step 180. It should be recognized that monitoring for a tone or 16 rings does not inhibit the programmed call in determination process described above.

If the number of rings counted equals or exceeds 16 rings, (YES, step 184), or if a tone preamble is detected (YES, step 178), then the microcontroller 32 is powered up, step 186. After determining the reason for the wakeup, the microcontroller then determines what is the MIU's call-in time interval for the particular response mode. The MIU's wakeup time is then set in the MIU's memory, step 188. In the case of tone demand reads, information is communicated in one of two ways: while the voice connection is still established or right after the voice connection is terminated. After setting the wakeup time, the MIU is instructed to go back to sleep, step 102.

Figure 3:
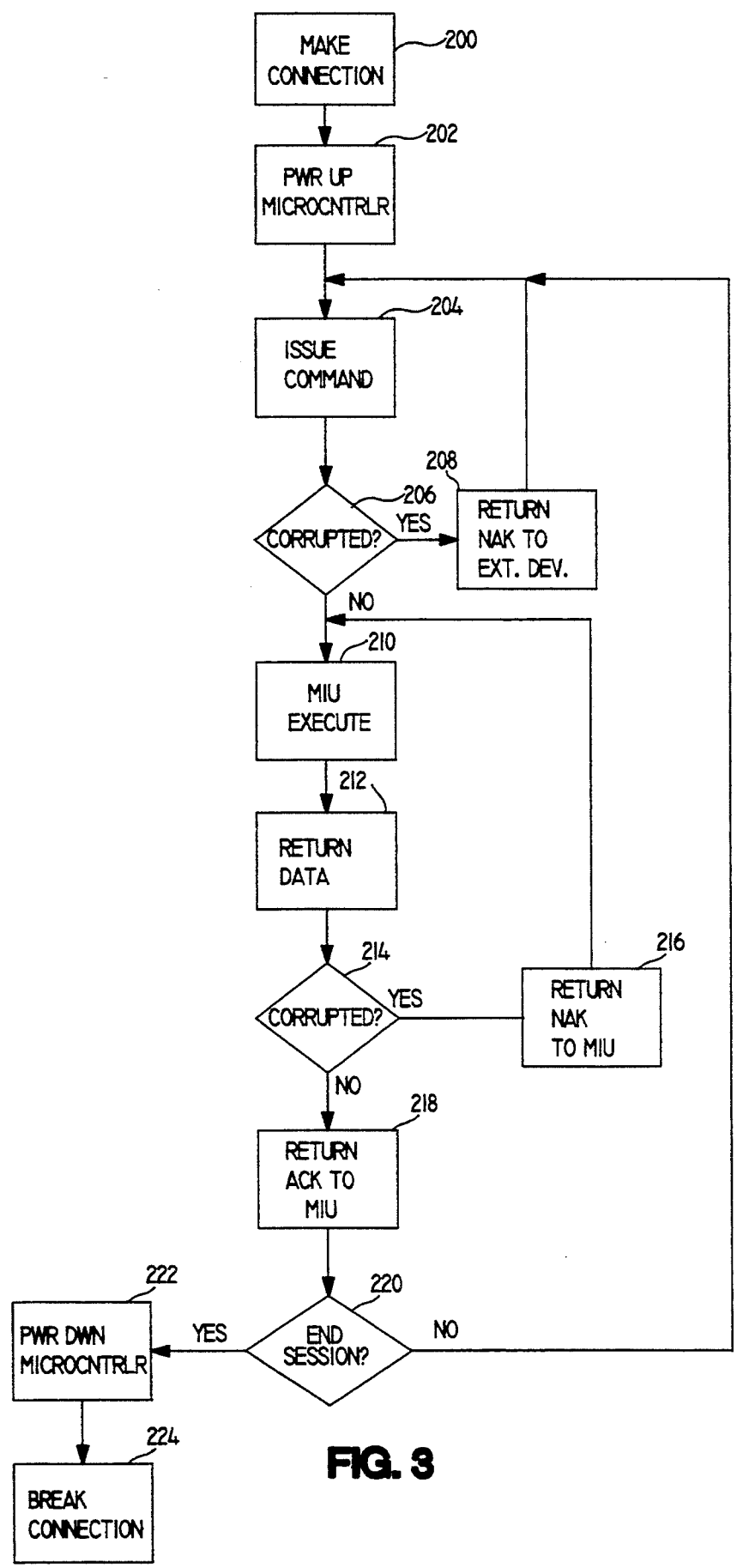
FIG. 3 is a flow diagram of system operation when initializing a meter interface unit.

The process for programming the MIU using an external device to initialize the MIU operating parameters is provided in FIG. 3. The external device (not shown) may be a personal computer (e.g., a laptop) or other programming units known in the art that can be adapted to program the MIU with the initial parameters. Alternatively, the external device could be used to perform a demand reading of the MIU and associated meter.

The external device is connected to the MIU 6 via the MIU's external port 42, step 200. The external device then provides a command to powerup the microcontroller 32, step 202. The microcontroller 32, when it wakes up, determines if it was woken up for a valid reason before it permits the establishment of the link between itself and the external device.

The external device then issues commands to the MIU, step 204. The commands are issued to initially set MIU operating parameters such as the MIU's ID number, the call-in phone numbers, and the time interval for the programmed call-in. The received command is then evaluated to see if it was correctly transmitted and received, step 206. If not properly received (YES), then a NAK message is returned to the external device, step 208 and the external device retransmits the command, step 204.

If the command is properly received (NO), then the MIU executes the command, step 210. In this case execution of the command involves storing an operating parameter in the non-volatile memory of the EEPROM. If a command from the external device involves the transmission of information from the MIU, then the MIU will return the requested data to the external device, step 212.

For example, after setting a parameter in the MIU the external device can interrogate the MIU to verify that the operating parameter was correctly set. The external device evaluates the data transmission to see if it was properly transmitted and/or received, step 214. If not (YES), then a NAK message would be returned by the external device, step 216 and the MIU would again transmit the requested information, step 212.

If the data return is properly received (NO), then a ACK message is returned by the external device to the MIU, step 218, and then an evaluation is made by the MIU to determine if the command received ends the session, step 220. If the session is not ended (NO), then the external device issues another command to the MIU for execution, step 204. If the session has ended (YES), then the microcontroller powers down the MIU, step 222 and the connection between the external device and the MIU is broken, step 224. Once the operating parameters are set in the MIU, the MIU begins to perform as part of a remote reading and data collection system 2 of the present invention.

It should be understood that the host computer 14, when interconnected to the MIU 6, can also reset operating parameters to reconfigure the MIU for future reads. The host computer can reset operating parameters by including the commands that set operating parameters along with the commands used to interrogate the MIU and extract information. For example, the host computer could set a new programmed call-in time interval for the MIU before ending a meter reading Session or disable the tone detection capability of the MIU.

Some typical commands that can be used in the system and by the external device, as well as a brief description of the command are as follows.

ENQUIRY: The enquiry command is intended to be a protocol definition command so that the host computer can determine a given MIU's protocol capabilities.

SET MIU ID: This command is used to set the MIU's unique identification number. The message block transmitted consists of the set id command code followed by a variable length string indicating the MIU ID number.

VIEW MIU ID: Command to MIU that requests the MIU to transmit its ID number back.

SET PHONE NUMBERS: This command is used to set the phone numbers to be called by the MIU. The message block sent consists of the command code followed by a data string that contains the phone number to be called; whether the phone number is the primary, alternate or emergency number; and the dialing technique to be emulated (i.e., pulse or dual tone multi-frequency, DTMF, tones).

SET MIU MODE: The set MIU mode command configures the MIU for various operating modes and is used to disable or enable certain features of the MIU. For example the set MIU mode command can be used to enable or disable the MIU's time based call-in mode, the MIU's low voltage call-in mode, the MIU's tone demand read call-in mode, or the MIU's 16 ring demand read call in mode.

SET PORT TYPE: Each port of the MIU that interconnects the MIU with the interfacing meter, can be set to read each encoder type of meter. Since the MIU of the present invention can be used with different types of encoder meters, a particular MIU port is assigned or set to read a given meter. This command is used to set the port assignment.

READ DATA: The command consists of the read data command code followed by the character indicating the port to be read.

SET CALLBACK TIME: This command is used to set the elapsed time (in seconds) until the next scheduled call-in to the host computer. The message block transmitted includes the set callback time command code followed by a data string indicating the elapsed time or callback time interval to be set in the MIU.

VIEW MIU DIAGNOSTIC DATA: The command is used to interrogate a particular MIU to recover data or information that can be used diagnostically to evaluate MIU, host computer, system and telephone performance.

While a preferred embodiment of the invention has been described using specific terms, such description is for illustrative purposes only, and it is to be understood that changes and variations may be made without departing from the spirit or scope of the following claims.

What is claimed is:

1. A call in-bound remote reading and data collection system for the remote reading of utility meters, comprising:
    data processing means for collecting, storing and processing data, said data processing means further including means for interconnecting said data processing means to conventional telephone lines;
    a meter interface unit remotely located from said data processing unit and being interconnected to at least one meter to be read; and
    wherein said meter interface unit further includes:
    elapsed time determining means for determining when a prespecified amount of time, an elapsed time interval, has elapsed, where one elapsed time interval is prespecified for making a scheduled automatic reading of the meter and another time interval is prespecified for making an unscheduled reading of the meter;
    phone line monitoring means for monitoring the telephone lines for telephone line transmissions;
    demand read means, responsive to said phone line monitoring means, for evaluating telephone line transmissions and determining when the telephone line transmissions indicate that the meter interface unit is to interconnect to the data processing means for the unscheduled reading of the meter;
    means for interconnecting said meter interface unit to said data processing means for communication and data transfer between said data processing means and said meter interface unit, where said meter interface unit is interconnected to said data processing means via the telephone lines when the elapsed time interval for making a particular meter reading is determined to have elapsed by said elapsed time determining means; and
    command and data processing means for processing commands from said data collection means and for outputting data, in response to the commands received, to said data collection means.

2. The call in-bound remote reading and data collection system of claim 1, wherein said meter interface unit includes a power supply means for selectively powering the meter interface unit during specified periods of meter interface unit activity.

3. The call in-bound remote reading and data collection system of claim 2, wherein said meter interface unit further includes timing means for periodically outputting a signal that is representative of a period of time; wherein said demand read means further includes tone sensing means for monitoring the telephone lines for the presence of a prespecified tone; and wherein said power supply means provides power to said tone sensing means each time a timing means output signal is received by said power supply means.

4. The call in-bound remote reading and data collection system of claim 3, wherein said demand read means further includes a ring demand means for monitoring the telephone line for the presence of ring bursts indicative of an incoming phone call and for determining if the number of ring bursts exceeds a prespecified value.

5. The call in-bound remote reading and data collection system of claim 4, wherein said meter interface unit further includes a power control means, responsive to the output signals from said timing means, for controlling said power supply so said command and data processing means is powered up after a prespecified time interval has elapsed and wherein said command and data processing means is powered up when it is determined that the elapsed time interval has elapsed.

6. The call in-bound remote reading and data collection system of claim 5, wherein said command and data processing means further includes time interval determining means for determining the prespecified time interval for said power control means.

7. The call in-bound remote reading and data collection system of claim 6, wherein the time interval determining means determines the prespecified time interval for periodically powering said command and data processing means based on the time which has elapsed and the elapsed time interval for interconnection.

8. The call in-bound remote reading and data collection system of claim 5, wherein said command and data processing means further includes callback determining means both for determining when an interconnection between said meter interface unit and said data collection means is unsuccessful and for determining the elapsed time interval for making another interconnection.

9. The call in-bound remote reading and data collection system of claim 8, wherein said callback determining means determines when to make another interconnection based on the data being transmitted and how many interconnections between said meter interface unit and said data processing means have been attempted.

10. The call in-bound remote reading and data collection system of claim 9, wherein said data processing means is provided with a plurality of different telephone numbers and wherein said command and data processing means selects one of the plurality of phone numbers for said meter interface unit interconnecting means to dial.

11. The call in-bound remote reading and data collection system of claim 8, wherein said meter interface unit further include telephone line status monitoring means for monitoring the telephone lines to determine if the telephone line is in use before said meter interface unit interconnects to said data processing means, where an interconnection is made when said line status monitoring means determines that the telephone lines are free and wherein said callback determining means determines the elapsed time interval for making another interconnection when said line status monitoring means determines that the telephone lines are busy.

12. The call in-bound remote reading and data collection system of claim 11, wherein said command and data processing means further includes timeout means for breaking the interconnection between said meter interface unit and said data processing means when a predetermined amount of time has elapsed since the transmission of information from said meter interface unit and wherein said callback determining means determines the elapsed time interval for making another interconnection when the predetermined amount of time has elapsed.

13. The call in-bound remote reading and data collection system of claim 12, wherein said command and data processing means further includes a meter interface connection that interconnects the meter to be read and said command and data processing means, wherein said meter interface connection is powered by said power supply in response to commands from said command and data processing means.

14. The call in-bound remote reading and data collection system of claim 13, wherein said power supply is batteryless.

15. The call in-bound remote reading and data collection system of claim 13, wherein said power supply includes a battery.

16. A call in-bound meter interface unit being interconnected to at least one utility meter to be read and for communicating data to a data processing means via conventional telephone lines, comprising:

elapsed time determining means for determining when a prespecified amount of time, an elapsed time interval, has elapsed, where one elapsed time interval is prespecified for making a scheduled automatic reading of the meter and another time interval is prespecified for making an unscheduled reading of the meter;

phone line monitoring means for monitoring the telephone lines being used for telephone line transmissions;

demand read means, responsive to said phone line monitoring means, for evaluating telephone line transmissions and determining when the telephone line transmissions indicate that an interconnection is to be made with the data processing means for the unscheduled reading of a meter;

means for interconnecting said command and data processing means to said data processing means for communication and data transfer between said data processing means and said command and data processing means, where said command and data processing means is interconnected to said data processing means via the telephone lines when the elapsed time interval for making a particular meter reading is determined to have elapsed by said elapsed time determining means; and command and data processing means, responsive to said elapsed time determining means and said demand read means, for processing commands from the data collection means and for outputting data, in response to the commands received, to the data collection means.

17. The call in-bound meter interface unit of claim 16, further including a power supply means for selectively powering the meter interface unit during specified periods of meter interface unit activity.

18. The call in-bound meter interface unit of claim 17, further including:

timing means for periodically outputting a signal that is representative of a period of time;

wherein said demand read means further includes tone sensing means for monitoring the telephone lines for the presence of a prespecified tone;

and wherein said power supply means provides power to said tone sensing means each time a timing means output signal is received by said power supply means.

19. The call in-bound meter interface unit of claim 18, wherein said demand read means further includes a ring demand means for monitoring the telephone line for the presence of ring bursts indicative of an incoming phone call and for determining if the number of ring bursts exceeds a prespecified value.

20. The call in-bound meter interface unit of claim 19, further including a power control means, responsive to the output signal from said timing means, for controlling said power supply so said command and data processing means is powered up after a prespecified time interval has elapsed and wherein said command and data processing means is powered up when it is determined that the elapsed time interval has elapsed.

21. The call in-bound meter interface unit of claim 20, wherein said command and data processing means further includes time interval determining means for determining the prespecified time interval for said power control means.

22. The call in-bound meter interface unit of claim 21, wherein the time interval determining means determines the prespecified time interval for periodically powering said command and data processing means based on the time which has elapsed and the elapsed time interval for interconnection.

23. The call in-bound meter interface unit of claim 20, wherein said command and data processing means further includes callback determining means both for determining when an interconnection between said meter interface unit and said data collection means is unsuccessful and for determining the elapsed time interval for making another interconnection.

24. The call in-bound meter interface unit of claim 23, wherein said callback determining means determines when to make another interconnection based on the data being transmitted and how many interconnections between said meter interface unit and said data processing means have been attempted.

25. The call in-bound meter interface unit of claim 24, wherein the data processing means is provided with a plurality of different telephone numbers and wherein said command and data processing means selects one of the plurality of phone numbers for said meter interface unit interconnecting means to dial.

26. The call in-bound meter interface unit of claim 23, wherein said meter interface unit further includes telephone line status monitoring means for monitoring the telephone lines to determine if the telephone line is in use before said meter interface unit interconnects to said data processing means, where an interconnection is made when said line status monitoring means determines that the telephone lines are free and wherein said callback determining means determines the elapsed time interval for making another interconnection when said line status monitoring means determines that the telephone lines are busy.

27. The call in-bound meter interface unit of claim 26, wherein said command and data processing means further includes timeout means for breaking the interconnection between said meter interface unit and said data processing means when a predetermined amount of time has elapsed since the transmission of information from said meter interface unit and wherein said callback determining means determines the elapsed time interval for making another interconnection when the predetermined amount of time has elapsed.

28. The call in-bound meter interface unit of claim 27, wherein said command and data processing means further includes a meter interface connection that interconnects the meter to be read and said command and data processing means, wherein said meter interface connection is powered by said power supply in response to commands from said command and data processing means.

29. The call in-bound meter interface unit of claim 28, wherein said power supply is batteryless.

30. The call in-bound meter interface unit of claim 28, wherein said power supply includes a battery.

31. A method for the remote reading of utility meters and the collection of data, comprising the steps of:
provide a data processing means to collect, store and process data, the data processing means further including means for interconnecting the data processing means to conventional telephone lines;
interconnecting a meter interface unit to at least one remotely located meter to be read and to the telephone lines;
prespecifying one amount of time, one elapsed time interval, for making a scheduled reading of at least one utility meter and prespecifying another amount of time, another elapsed time interval, for making an unscheduled demand reading of at least one utility meter;
determining when the elapsed time interval for making a particular meter reading has elapsed;
monitoring the telephone lines for telephone line transmissions;
evaluating telephone line transmissions and determining when the telephone line transmissions indicate that the meter interface unit is to interconnect to the data processing means via the telephone lines for the unscheduled reading of at least one utility meter;
interconnecting the meter interface unit and the data processing means via the telephone lines, when said determining determines that the elapsed time interval specified for the particular meter reading has elapsed, for communication and data transfer between the data processing means and the meter interface unit;
processing commands from the data collection means and outputting data, in response to the commands received, to the data collection means after interconnecting the meter interface unit and the data processing means.

32. The method for the remote reading of utility meters and the collection of data of claim 31, further including the step of selectively powering the meter interface unit during specified periods of meter interface unit activity.

33. The method for the remote reading of utility meters and the collection of data of claim 32, further including the steps of:
periodically powering up a tone sensing means; and
monitoring the telephone lines with the tone sensing means for the presence of a prespecified tone.

34. The method for the remote reading of utility meters and the collection of data of claim 33, further including the steps of monitoring the telephone line for the presence of ring bursts indicative of an incoming phone call and determining if the number of ring bursts exceeds a prespecified value.

35. The method for the remote reading of utility meters and the collection of data of claim 34, further including the step of periodically performing said determining when the prespecified amount of time has elapsed.

36. The method for the remote reading of utility meters and the collection of data of claim 35, further including the step of determining a prespecified interval for said periodically performing.

37. The method for the remote reading of utility meters and the collection of data of claim 36, wherein said step of determining the prespecified interval is based on the time which has elapsed and the elapsed time interval specified for interconnection.

38. The method for the remote reading of utility meters and the collection of data of claim 35, further including the steps of:
determining when an interconnection between the data processing means and the meter interface unit is unsuccessful; and
determining the elapsed time interval for making another interconnection attempt.

39. The method for the remote reading of utility meters and the collection of data of claim 38, wherein said determining the elapsed time interval for making another interconnection attempt determines the elapsed time interval based on the data being transmitted and how many interconnections between the meter interface unit and the data processing means have been attempted.

40. The method for the remote reading of utility meters and the collection of data of claim 39, further including the step of selecting one of a plurality of telephone numbers assigned to the data processing unit and dialing that number to interconnect the data processing means and the meter interface unit.

41. The method for the remote reading of utility meters and the collection of data of claim 38, further including the steps of:

status monitoring the telephone lines to determine if the telephone line is in use before dialing the data processing means' assigned telephone number, where an interconnection is attempted when said status monitoring determines that the telephone lines are free; and repeating said determining the elapsed time interval for making another interconnection when said line status monitoring indicates that the telephone lines are busy.

42. The method for the remote reading of utility meters and the collection of data of claim 38, further including the steps of:

breaking the interconnection between the meter interface unit and the data processing means when a predetermined amount of time has elapsed since the transmission of information from the meter interface unit; and repeating said determining the elapsed time interval for making another interconnection when the predetermined amount of time has elapsed.

43. The method for the remote reading of utility meters and the collection of data of claim 38, further including the steps of interconnecting the meter to be read and the meter interface unit, and providing power to the meter after an interconnection between the meter interface unit and the data processing means has been established; and interrogating the meter for register data.

44. The method for the remote reading of utility meters and the collection of data of claim 38, further including the step of providing a meter interface unit that is batteryless.

45. The method for the remote reading of utility meters and the collection of data of claim 38, further including the step of providing a meter interface unit powered by a battery.

* * * * *